United States Patent
Jahreis et al.

(10) Patent No.: US 6,839,515 B1
(45) Date of Patent: Jan. 4, 2005

(54) METHOD FOR ESTABLISHING A COMMUNICATION ON A STANDBY LINK IN OPTICAL TRANSMISSION FACILITIES

(75) Inventors: Oliver Jahreis, München (DE); Jürgen Heiles, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/646,367
(22) PCT Filed: Dec. 3, 1998
(86) PCT No.: PCT/DE98/03561
§ 371 (c)(1), (2), (4) Date: Oct. 19, 2000
(87) PCT Pub. No.: WO99/48229
PCT Pub. Date: Sep. 23, 1999

(30) Foreign Application Priority Data

Mar. 18, 1998 (DE) ............................................ 198 11 831
Aug. 7, 1998 (DE) ............................................ 198 35 863

(51) Int. Cl.⁷ ............................................... G02F 1/00
(52) U.S. Cl. ................................ 398/5; 398/15; 398/23; 398/30; 398/38; 398/13; 398/16; 398/22; 398/33; 370/220; 370/217; 370/225; 370/226; 370/227; 375/228; 375/260; 375/257; 340/827; 340/825.01; 371/20.1
(58) Field of Search ................................... 398/5, 15, 13, 398/23, 16, 30, 22, 38, 33; 370/220, 217, 225, 226, 227; 375/228, 260, 257; 340/827, 825.01; 371/20.1

(56) References Cited

U.S. PATENT DOCUMENTS

| | | | | |
|---|---|---|---|---|
| 5,136,410 A | * | 8/1992 | Heiling et al. | 398/15 |
| 5,428,471 A | * | 6/1995 | McDermott | 398/181 |
| 5,706,277 A | | 1/1998 | Klink | |
| 5,757,526 A | * | 5/1998 | Shiragaki et al. | 398/5 |
| 6,194,707 B1 | * | 2/2001 | Yang | 250/227.15 |
| 6,285,481 B1 | * | 9/2001 | Palmer | 398/119 |
| 6,356,367 B1 | * | 3/2002 | DeCusatis et al. | 398/5 |

FOREIGN PATENT DOCUMENTS

EP      0 535 858 A2      4/1993

OTHER PUBLICATIONS

Hamel et al., "First results of an experimental Coloured Section Ring", 22$^{nd}$ European Conference on Optical Communication—ECOC '96, Oslo, pp. 3.51–3.54.

Japanese Abstract, Publication No. 60160734, Publication Date Aug. 22, 1985.

Japanese Abstract, Publication No. 61232734, Publication Date Oct. 17, 1986.

* cited by examiner

Primary Examiner—Hanh Phan
(74) Attorney, Agent, or Firm—Bell Boyd & Lloyd LLC

(57) ABSTRACT

A method for standby switching in optical transmission devices is provided, wherein, in addition to a working signal and a protection signal, respective control signals with information concerning the allocation state are transmitted and evaluated at the receiving end. The control signals are transmitted via a monitoring channel even when the useful signal is switched off.

11 Claims, 3 Drawing Sheets

METHOD FOR ESTABLISHING A COMMUNICATION ON A STANDBY LINK IN OPTICAL TRANSMISSION FACILITIES

BACKGROUND OF THE INVENTION

In optical transmission networks, in the event of disturbances to a connection, a so-called protection connection is switched via another transmission path. For ring networks, instances of such standby switching are described, for example, in "26$^{th}$ European Conference On Optical Communication ECOC 96, Oslo, pages 3.51 to 3.54". In the so-called "hot standby" mode, the same message is continuously transmitted in parallel via additional protection data paths, so that a switchover can be effected without a time delay in the event of a disturbance.

Additional problems also arise in the context of optical transmission by means of wavelength division multiplex technology, which problems make it more difficult to identify a line breakage or other failure of the useful signal. For safety reasons, the optical transmission signal is switched off in the event of a disturbed connection; for example, by the laser or an optical amplifier connected downstream being switched off or by a switch being actuated. These measures are referred to as laser safety switch-off.

It is thus customary to transmit further data in addition to the useful data in a service channel, so that even in the event of the failure of useful data (payload), a signal with a non-negligible level is received. On the other hand, the transmission signal or transmission channel should not be switched off even when no useful signal is transmitted or, in the case of a wavelength division multiplex signal, no channel is busy.

An object of the present invention is to determine a reliable criterion for the failure of the useful signal and, in this case, if possible, to generate a signal for fiber standby switching but to avoid instances of erroneous standby switching. Furthermore, the intention is to perform laser safety switch-off of the disturbed transmission line which enables renewed switching-on without any problems.

SUMMARY OF THE INVENTION

The problem of an expedient safety switch-off of the useful signal is solved via associated methods.

The criteria which trigger a protection switchover are also used for laser safety switch-off. The method, which is simple to achieve, provides for reliable identification of an absent useful signal. In the case of the present invention, even if the laser/amplifier for the useful signal to be transmitted is switched off in one terminal, control signals continue to be transmitted with a permissible level to the corresponding terminal. This makes it possible for the system to be switched on anew or switched on again without the monitoring mode having to be deactivated. The energy in the monitoring channel is dimensioned to preclude any danger to engineers performing repair work.

Via the monitoring channel, the station receiving control signals is informed about the operating state of the corresponding terminal and can receive the latter's laser switch-off signal (remote laser safety switching). Through the control signals, the monitoring channel enables renewed start-up without the monitoring devices having to be switched off and possibly endangering engineers who are rectifying the fault. A test transmission of signals at high energy is no longer necessary.

The transmission of the control information items in an "out of band" monitoring channel has the advantage that low transmission power levels are additionally necessary since the control signals can be regenerated anew in each amplifier station.

Additional features and advantages of the present invention are described in, and will be apparent from, the following Detailed Description of the Invention and the Figures.

DETAILED DESCRIPTION OF THE INVENTION

Figure 1:
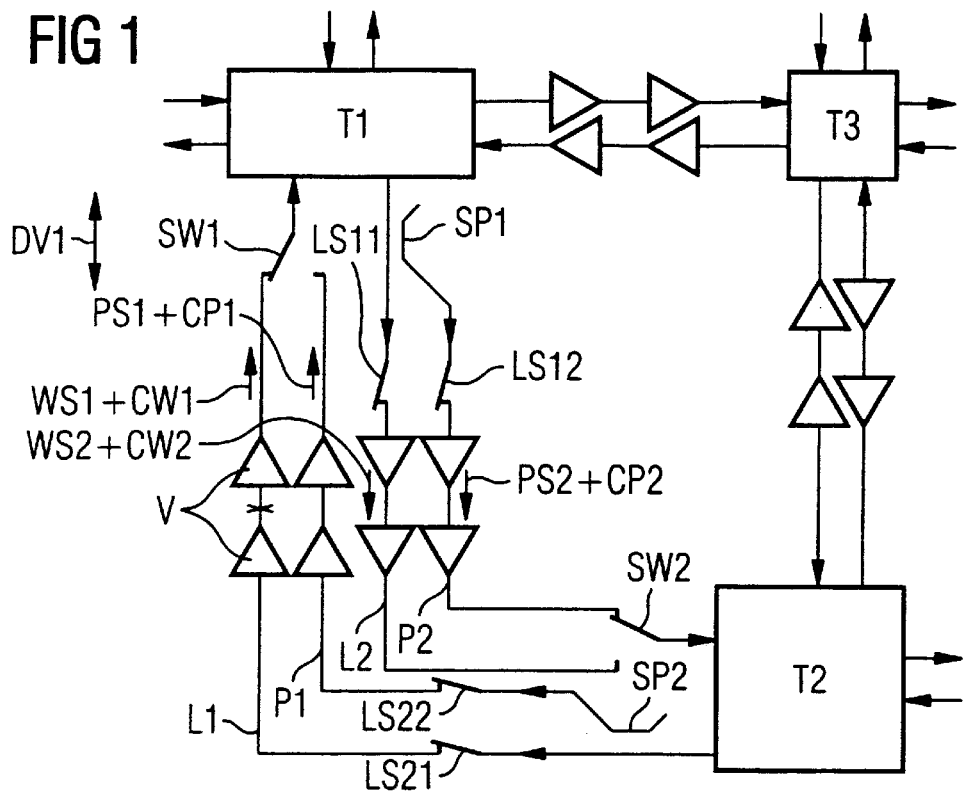
FIG. 1 shows the basic structure of a transmission network.

FIG. 1 shows the part of a transmission network with three terminals T1 to T3. Of this, the connection DV1 between the terminals T1 and T2 will initially be considered in greater detail. A first working signal WS1 is transmitted via a first working optical fiber L1 from the terminal T2, which is a cross-connector, for example, to the terminal T1. At the same time, an identical protection signal PS1 is transmitted via a second optical fiber, the protection optical fiber P1. Each of these signals may include one or more signal elements which are each assigned a wavelength. In addition, a control signal CS1, CP1 (or a number of control signals) is transmitted via a respective monitoring channel. The signal contains, inter alia, allocation information specifying whether at least one signal element is being transmitted (or no signal is being transmitted). In alternative embodiments, the number of signal elements which are present or absent can be specified.

In the opposite direction, a working signal WS2 and a protection signal PS2 and also their associated control signals CW2, CP2, are likewise transmitted via further optical fibers L2 and P2 to the second terminal T2. In this exemplary embodiment, the protection signal is tapped off from the original transmission signal by a respective splitter SP1 and SP2. Equally, it is customary for the transmitting devices to be doubled. Different control signals may also be provided.

The control signal can, in each case either be inserted at the transmitting end and be transmitted (in band) with the useful signal (payload) or, alternatively, be transmitted outside the actual transmission band (out of band) and be checked and regenerated in each amplifier/regenerator. In this exemplary embodiment, the same allocation information is transmitted via the working and protection optical fibers, which may also contain separate information items for the working and protection connections.

If the working optical fiber L1, provided with amplifiers V, breaks, it is then necessary to switch over to the protection optical fiber P1 with the aid of a changeover switch SW1. The same applies correspondingly to the second terminal T2.

Figure 2:
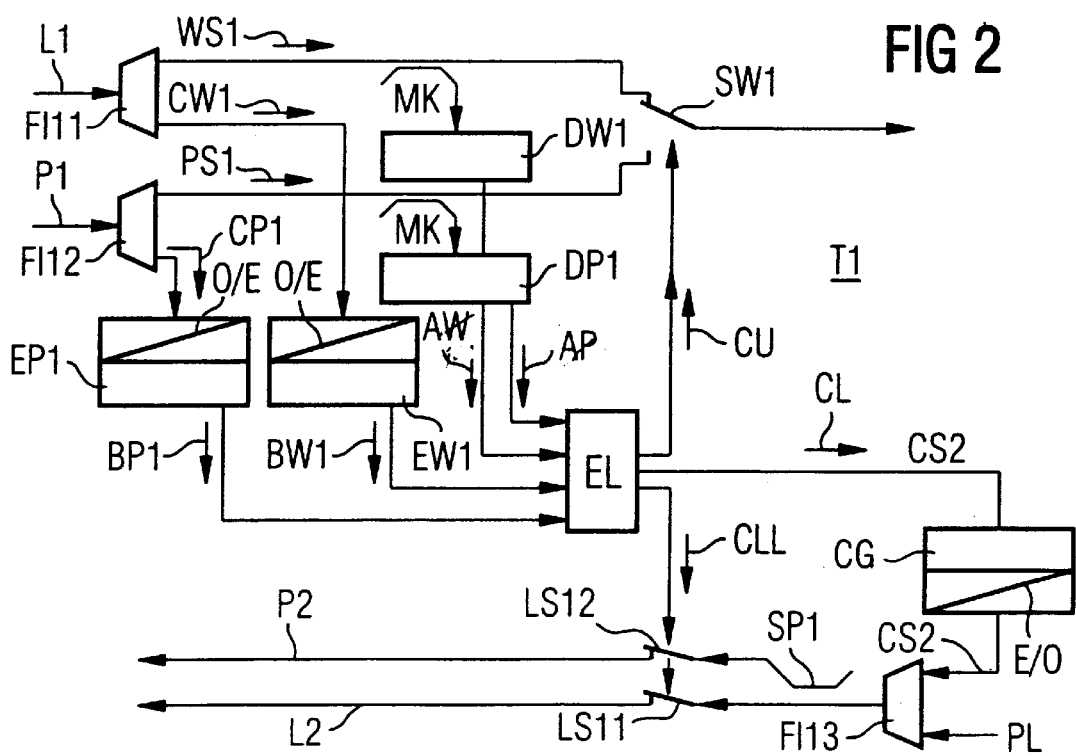
FIG. 2 shows an arrangement for standby switching and for laser safety switch-off.

An arrangement for monitoring the reception signals and for protection switchover is illustrated in more detail in FIG. 2. In a first filter device (wavelength division demultiplexer) FI11, the control signal CW1 is separated from the working signal WS 1 and, after opto-electrical conversion O/E, is fed to a first control signal evaluation device EW1, which ascertains on the basis of the transmitted allocation information BW1 whether the working signal WS1 is being transmitted or the corresponding transmitting device is unoccupied. The allocation information BW1 is buffer-stored and fed to a decision logic unit EL.

In the same way, the protection control signal CP1 is separated via a filter device FI12, evaluated in a second control signal evaluation device EP1 and the allocation information BP1 (which is identical in this exemplary embodiment) is likewise fed to the decision logic unit EL.

The working signal WS1 separated from the control signal is fed via a measurement coupler MK to a signal detector DW1, which ascertains whether at least one signal element is being received and outputs an active criterion AW (or ascertains "loss of payload").

Likewise, the protection signal PS1 is checked in a second signal detector DP1 and, if appropriate, a corresponding active criterion AP (active protection) is ascertained.

The outputs of the two signal detectors are likewise connected to the decision logic unit. Further criteria for reliably identifying a useful signal may likewise be used. However, the level monitoring is particularly suitable for transparent transmission systems.

As in the other terminals, too, in the terminal 1 the useful signal PS2 to be transmitted and the control signal CS2 are combined via a filter (wavelength division multiplexer, coupler) FI13. If the control signal is superposed on the useful signal by modulation, the filters are replaced, of course, by corresponding modulators and demodulators. A splitter SP1 effects splitting into a working signal and a protection signal.

The decision logic unit EL outputs a switchover criterion CU when one of the control signals CW1 or CP1 signals that although the working signal WS1 is being transmitted, it is not being received. Switchover should be effected only when the protection signal PS1 is received.

In the event of the failure of the working signal WS1, the decision logic unit additionally initiates, through switch-off signaling CL, the transmission of a corresponding control signal, a remote laser switch-off signal, through a control signal generator CG to the terminal 2, which leads to the opening of a laser safety switch LS21 (FIG. 1), with the result that no more energy is transmitted on the defective working optical fiber L1.

In the event of the failure of the working signal WS1 and/or of the protection signal PS1, the dedicated laser is switched off by the switch-off criterion CLL or one of the laser safety switches LS11 and LS12 are opened. The switching-off of the transmission signal has the effect in the terminal T2 that here the laser or the non-received signal is likewise switched off, with the result that no power is transmitted to the terminal T1 and repair work can be carried out without danger.

In order to switch on the transmission device or for renewed switching-on after a repair, the switch-off logic unit is temporarily deactivated. It is also customary to signal the renewed switch-on by briefly switching on the laser.

Figure 3:
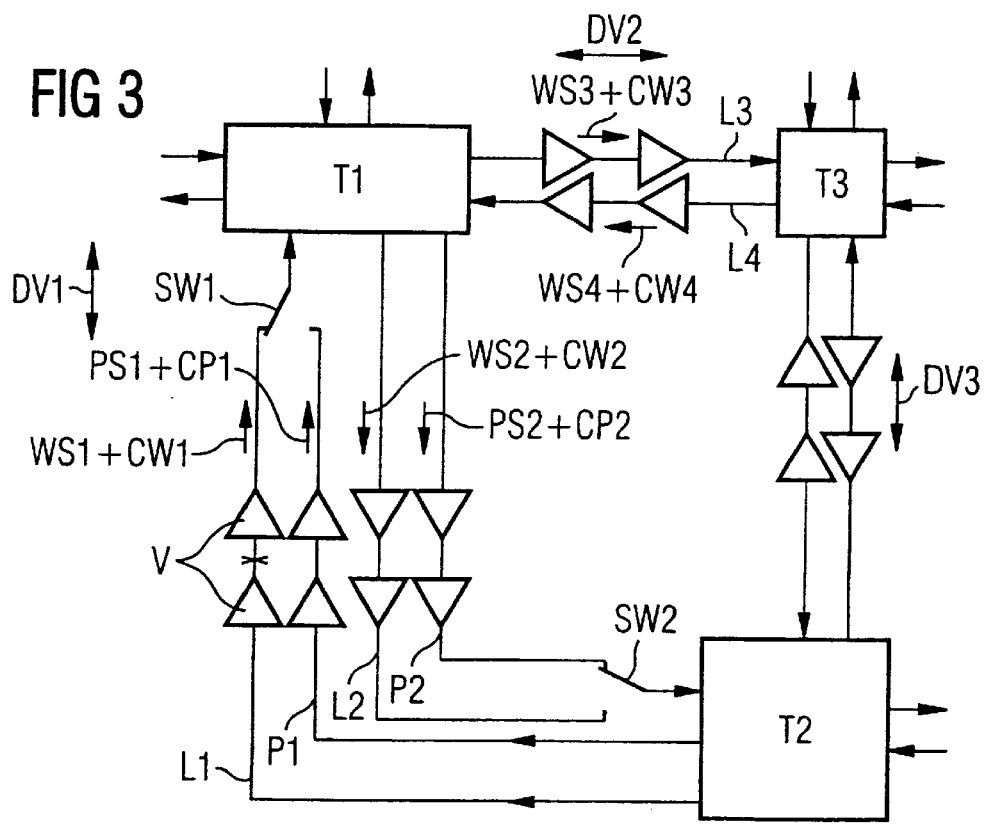
FIG. 3 shows a variant of the transmission network according to the present invention.

FIG. 3 illustrates an embodiment of the present invention in which the useful signals can be switched off individually.

Figure 4:
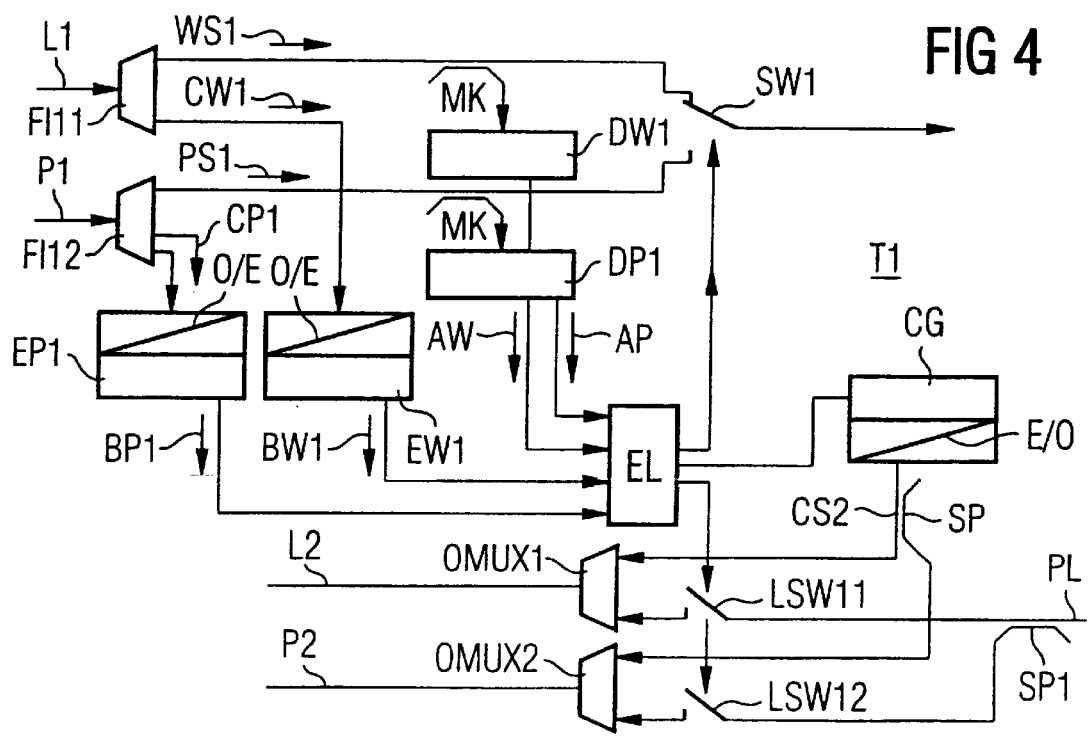
FIG. 4 shows an arrangement for standby switching and for laser safety switch-off in the case of the variant in FIG. 3.

The data connection DV1 will again be considered in the first instance. The laser safety shutdown switches LS11, LS12, LS21 and LS22 of the terminals T1 and T2 are not shown in the illustration. As can be seen from FIG. 4, however, the monitoring channel or the control signal (control signals) CS2 is now split into two signals by a splitter SP and respectively combined with the working signal or protection signal via optical multiplexers (filters or couplers) OMUX1 and OMUX2. The laser safety shutdown switches LSW11 and LSW12 now switch off only the useful signal ("payload"; working or protection signal) PL for each optical fiber separately (or jointly in another embodiment). The control signals CW2 and CP2 can continue to be transmitted on both optical fibers to the terminal T2. It is also possible to transmit different control signals using time division multiplexing or different control signals via the working and protection line.

In the event of a fiber breaking, such as the working optical fiber L1, neither the working signal WS1 nor the associated control signal CW1 is received by the terminal T1. This prompts the decision logic unit EL to change or switch off the control signals CS2 to be transmitted, which are also referred to as SA signal "still alive", or to transmit a corresponding remote laser switch-off signal, often referred to as RLSS "remote laser safety switching", as a result of which the terminal T2 that has received this signal is prompted to switch off the useful signal.

If neither the working signal nor the protection signal is received by the terminal T1, as a rule no useful signals are returned either, which can additionally be taken into account by the decision logic unit of the terminal T2. The transmission of the corresponding transmission signal can already cease in the event of a failed useful signal.

It is also the case in the event of a laser safety switch-off of the dedicated useful transmission signal that has occurred on account of an absent reception signal, the useful signal or the control signal, in the terminal T1 that the corresponding terminal T2 is informed via the monitoring channel, which is still active, of whether and which of the received signals (working or protection) is disturbed or undisturbed and which laser safety shutdown switch in the terminal T2 corresponding to the laser safety shutdown switches LSW11 or LSW12 of the terminal T1 is to be actuated.

Whereas, in the event of the failure of a reception signal, the corresponding transmission signal including the control signal can also be switched off, since, after all, a further transmission channel is available, this is no longer possible in the event of the failure of the working signal and of the protection signal and should not, therefore, actually be carried out. Moreover, the control signals continue to be transmitted.

In the event of reinstallation or in the event of renewed switching-on after a repair, owing to the fact that the control signals can continue to be transmitted, the switch-off logic unit must no longer be deactivated, in order to avoid reestablishment of the connection being prevented, since the control signals are always transmitted and change in accordance with the state of the data connection. If the terminal T1 receives the control signal, a remote laser switch-off signal is no longer transmitted and the safety switch-off ("remote laser safety switching") initiated in the terminal T2 is canceled.

A precondition for the application of this embodiment is that the control signals be transmitted with an appropriately low level which does not signify a danger to the repair personnel.

Figure 5:
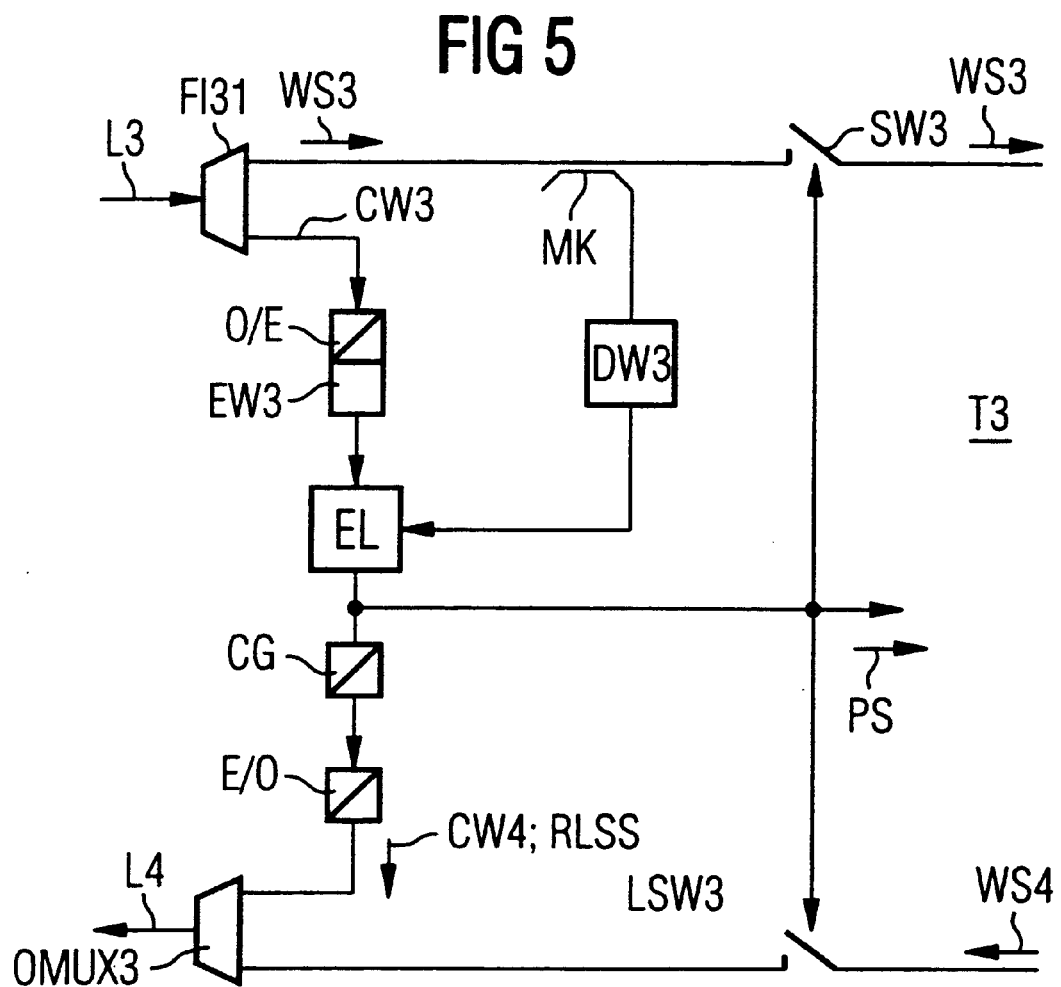
FIG. 5 shows an arrangement for laser safety switch-off and for standby switching in the case of connections embodied in a simple manner.

According to FIG. 3, the terminal T3 is only provided with working connections WS3 and WS4 to the terminal T1. FIG. 5 illustrates a basic circuit diagram of the terminal insofar as it relates to the laser switch-off. The circuit diagram corresponds to the decision logic for, in each case, one of the optical fibers of the connection DV1 between the terminals T1 and T2. Since, between the terminal T1 and the terminal T3, via the data connection DV2, only the working signals WS3 and WS4 with their control signals CW3 and CW4 are transmitted via separate optical waveguides, (e.g., the decision logic unit EL of the terminal T3 only has to evaluate the working signal WS3 and the associated control signal CW3), only a control signal evaluation device EW3 and a signal detector DW are correspondingly provided. The filter units, etc., are designated in accordance with FIG. 4.

In the event of a failure of the working signal WS3 and of the control signal CW3, it is concluded that there is a break in a fiber, the working signal WS4 to be transmitted is switched off and, via the control signal generator CG, a correspondingly changed control signal CW4 (alternatively no control signal) or an additional laser switch-off signal RLSS is transmitted after the electro-optical conversion E/O via the monitoring channel, which is still active, to the remote station, the terminal 1. Furthermore, standby switching via data connections DV3 (FIG. 3) which are still intact can be initiated by the decision logic unit through a protection signal PS.

In principle, the laser safety switch-off in the terminal T1 can also be effected just on account of the remote laser switch-off signal of the terminal T3. For safety reasons, however, the working signal WS4 is switched off. In the terminal T1, which receives the laser switch-off signal, once again the reception signal is advantageously evaluated as -well, as before, and only if the signal is absent is the dedicated working signal to be transmitted switched off. This avoids unnecessary switching-off if, in a simple embodiment of the present invention, interference with the control signal is already understood as a request for laser switch-off.

Figure 6:
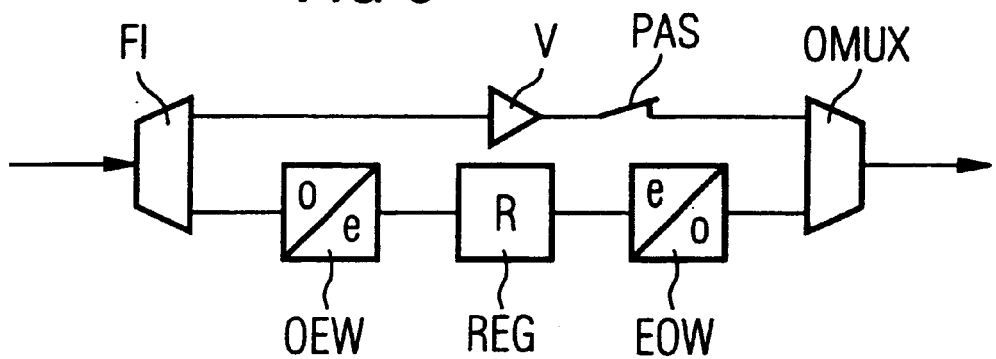
FIG. 6 shows an amplifier station.

FIG. 6 illustrates an amplifier station as is provided between the terminals. For each transmission direction, it contains a filter arrangement Fl for splitting the incoming signal into a useful signal and a control signal. The transmission path of the useful signal contains an amplifier V and, if appropriate, a regenerator as well. For the monitoring channel, a separate regenerator RG and an electro-optical transducer EOW are provided in addition to an opto-electrical transducer OEW. After amplification and/or regeneration, the useful signal and the control signals are combined via an optical multiplexer OMUX. In the event of an absent useful signal, the output signal of the amplifier is switched off by a level shutdown switch PAS through a monitoring device (not illustrated here), with the result that, in a manner governed by the amplifier control, no interference signals are forwarded. Under certain circumstances, the control signal may also be amplified together with the useful signal (in band monitoring channel). A corresponding reduction of an interference level must then be ensured.

Although the present invention has been described with reference to specific embodiments, those of skill in the art will recognize that changes may be made thereto without departing from the spirit and scope of the present invention as set forth in the hereafter appended claims.

What is claimed is:

1. A method for at least one of laser safety switch-off and fiber standby switching in optical transmission devices, the method comprising the steps of:

jointly transmitting, via a working optical fiber, from a first terminal to a second terminal, a working signal and an associated control signal;

jointly transmitting, via a protection optical fiber, from the first terminal to the second terminal, a protection signal and an associated control signal;

jointly transmitting, via a further working optical fiber, from the second terminal to the first terminal, a further working signal and an associated control signal;

jointly transmitting, via a further protection optical fiber, from the second terminal to the first terminal, a further protection signal and an associated control signal;

evaluating at least one of a working signal, a protection signal and a control signal at a respective receiving end;

making a switchover, if one of the working or protection signals is disturbed or absent, to the respectively associated undisturbed signal;

transmitting, if one of the working signals including its associated control signal or protection signals including its associated control signal is not received in the respectively corresponding first and second terminals, one of a changed control signal and a remote laser switch-off signal to the respectively corresponding first or second terminal to prevent the transmission of the respective working signal or the respective protection signal, but with the respectively associated control signal continuing to be transmitted with a low permissible level; and ending, upon a respective connection being switched on, signaling of one of the changed control signal and the remote laser switch-off signal by reception of the respectively corresponding control signal.

2. A method as claimed in claim 1, wherein a switchover is made to the protection signal only when a criterion for a presence of the protection signal has been determined.

3. A method as claimed in claim 1, the method further comprising the steps of:

checking a presence of the received working signal and the protection signal by monitoring at least one of a respective signal level and the control signals; and evaluating the check in connection with deciding whether at least one of a protection switchover and a switch-off of the useful signal should be effected.

4. A method as claimed in claim 3, the method further comprising the steps of:

switching off, upon failure of one of the received working signal and the received protection signal, in the respectively corresponding first or second terminal, the respectively corresponding working signal or protection signal to be transmitted; and transmitting one of changed control signals and remote laser switch-off signals.

5. A method as claimed in claim 4, the method further comprising the step of triggering the switch-off, in the respectively corresponding first or second terminal, upon the absence of one of the received working signal and the received protection signal, and upon the absence of one of a changed control signal and a remote laser switch-off signal, for the respective useful signal not received by its respectively associated first or second terminal.

6. A method as claimed in claim 1, the method further comprising the step of switching off, upon failure of one of the received working signal and the received protection signal, in the respectively corresponding first or second terminal, the respectively corresponding working signal or protection signal to be transmitted.

7. A method for at least one of laser safety switch-off and standby switching in an optical transmission device, the method comprising the steps of:

respectively transmitting first and second working signals and respectively assigned first and second control signals between a first terminal and a further terminal in each transmission direction, respectively, via a first optical fiber and a further optical fiber, respectively;

switching off, if one of the first and second working signals transmitted via its respective optical fiber, including its respectively assigned control signal, is not received by the respective receiving terminal, the respective working signal to be transmitted to the other receiving terminal via its respective, other optical fiber; and transmitting, in a monitoring channel which is still active, via the other optical fiber, one of a changed control signal and a remote laser switch-off signal to the respectively corresponding first or second terminal, thereby preventing transmission of the non-received working signal, but with the respectively assigned control signal continuing to be transmitted with a low permissible level; and ending, upon a respective connection being switched on, signaling of one of the changed control signal and the remote laser switch-off signal by reception of the corresponding control signal.

8. A method as claimed in claim 7, wherein the laser safety switch-off of the working signal to be transmitted is effected if, in addition to one of the changed first or second control signal and a special remote laser switch-off signal, no working signal is received.

9. A method as claimed in claim 7, wherein upon occurrence of a non-received working signal, fiber standby switching via an undisturbed data connection is effected.

10. A method as claimed in claim 7, wherein the first and second control signals are transmitted via monitoring channels with wavelengths outside a useful band of the working and protection channels, respectively.

11. A method as claimed in claim 7, wherein an allocation information item is transmitted as one of the first and second control signals, the information item signaling transmission of at least one signal element of a wavelength division multiplex signal, and with the information item being evaluated at the respectively corresponding first or second terminal for deciding whether at least one of a protection switchover and a switch-off of the useful signals should be effected.

* * * * *